United States Patent
Onoe

(10) Patent No.: US 10,972,615 B2
(45) Date of Patent: Apr. 6, 2021

(54) DATA PROCESSING APPARATUS, DATA PROCESSING METHOD, AND STORAGE MEDIUM

(71) Applicant: Konica Minolta, Inc., Tokyo (JP)

(72) Inventor: Taro Onoe, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/779,802

(22) Filed: Feb. 3, 2020

(65) Prior Publication Data

US 2020/0267263 A1 Aug. 20, 2020

(30) Foreign Application Priority Data

Feb. 14, 2019 (JP) .............................. JP2019-024208

(51) Int. Cl.
*H04N 1/00* (2006.01)

(52) U.S. Cl.
CPC ..... *H04N 1/00034* (2013.01); *H04N 1/00023* (2013.01); *H04N 1/00045* (2013.01); *H04N 1/00087* (2013.01)

(58) Field of Classification Search
CPC .......... H04N 1/00034; H04N 1/00045; H04N 1/00087; H04N 1/00023
See application file for complete search history.

(56) References Cited

U.S. PATENT DOCUMENTS

| 2009/0323081 | A1* | 12/2009 | Hirano | G01M 11/0214 356/601 |
|---|---|---|---|---|
| 2017/0094251 | A1* | 3/2017 | Wolke | H04N 13/246 |
| 2018/0202797 | A1* | 7/2018 | Kawashima | G01B 11/026 |
| 2019/0158812 | A1* | 5/2019 | Peeters | H04N 5/232 |

FOREIGN PATENT DOCUMENTS

| JP | 2017161245 A | * | 9/2017 |
|---|---|---|---|
| JP | 2017161245 A | | 9/2017 |

* cited by examiner

*Primary Examiner* — Ted W Barnes
(74) *Attorney, Agent, or Firm* — Buchanan Ingersoll & Rooney PC

(57) ABSTRACT

A data processing apparatus processes measured data obtained from a first line sensor and a second line sensor. The data processing apparatus includes a hardware processor. The hardware processor is configured to obtain measured data from the first line sensor and the second line sensor, and a reference plane plate is measured in two or more positions differed by rotation around an axis orthogonal to the first coordinate plane and the second coordinate plane. The hardware processor is configured to calculate an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

7 Claims, 11 Drawing Sheets

DATA PROCESSING APPARATUS, DATA PROCESSING METHOD, AND STORAGE MEDIUM

CROSS-REFERENCE TO RELATED APPLICATIONS

The entire disclosure of Japanese Patent Application No. 2019-024208 filed on Feb. 14, 2019 is incorporated herein by reference in its entirety.

BACKGROUND

Technological Field

The present invention relates to a data processing apparatus, a data processing method, and a storage medium.

Description of the Related Art

The image forming apparatus employing the electrophotography method exposes light to a charged photoconductor to form an electrostatic latent image, and supplies toner on the electrostatic latent image on the photoconductor with a developing roller to develop the image. With this, the toner image is formed. The distance between the photoconductor and the developing roller positioned inside the image forming apparatus directly determines the developing density. Therefore, the distance needs to be measured and adjusted with high accuracy.

Conventionally, a laser light with a certain width is irradiated between the photoconductor and the developing roller. The width of the light which passes between the photoconductor and the developing roller is measured to measure the distance between the photoconductor and the developing roller.

However, if two developing rollers are provided for the photoconductor, due to the space between the developing rollers, the light which passes between the photoconductor and the developing roller cannot be measured, and the conventional distance measuring method cannot be used. In view of the above, it is possible to use a method in which the distance between the two objects are measured by measuring a surface shape (position) of the two objects with two line sensors, and handling the measured data obtained by each line sensor on the same coordinate system (stereo calibration). By showing the surface shape of the photoconductor obtained from one line sensor and the surface shape of the developing roller obtained from the other line sensor on the same coordinate system, the distance between the photoconductor and the developing roller can be calculated.

There is an apparatus in which two line sensor cameras image a calibration marker in which a white color region and a black color region are positioned alternately to perform calibration of the line sensor camera (JP 2017-161245).

However, if the measured data obtained by two line sensors is used on the same coordinate system, a marker with which absolute coordinates are defined in advance needs to be used. Therefore, it is difficult to perform calibration easily and at a low cost.

SUMMARY

The present invention is conceived in view of the above-described conventional technique and the object of the present invention is to perform the calibration of two line sensors simply and at a low cost.

To achieve at least one of the abovementioned objects, according to an aspect of the present invention, the data processing apparatus reflecting one aspect of the present invention is a data processing apparatus which processes measured data obtained from a first line sensor and a second line sensor which measure a shape of a measured target as measured data on two-dimensional coordinates, the apparatus including: a hardware processor, wherein the hardware processor is configured to, obtain measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and calculate an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

According to another aspect, a data processing method which processes measured data obtained from a first line sensor and a second line sensor which measure a shape of a measured target as measured data on two-dimensional coordinates, the method including: obtaining measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and calculating an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

According to another aspect, a non-transitory computer-readable storage medium storing a program causing a computer which processes measured data obtained from a first line sensor and a second line sensor which measure a shape of a measured target as measured data on two-dimensional coordinates, the program causing a computer to: obtain measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and calculate an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, with reference to the drawings, the embodiment of the data processing apparatus according to the present invention is described. The scope of the invention is not limited to the illustrated drawings.

[Line Sensor]

First, the line sensor used in the present embodiment is described.

Figure 1:
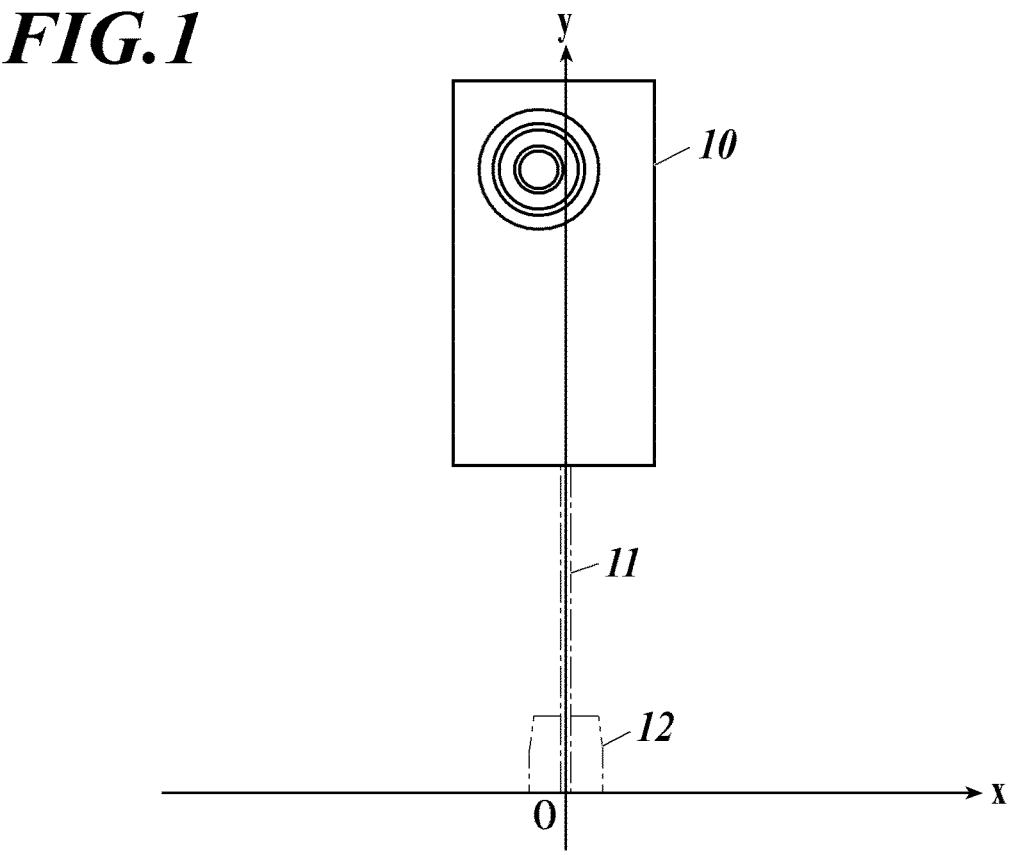
FIG. 1 is a diagram showing a coordinate system of measured data obtained by a line sensor used in the present embodiment.

FIG. 1 shows a coordinate system of measured data obtained by the line sensor 10. The line sensor 10 measures a shape of a measured target as measured data (x, y) on two-dimensional coordinates. The line sensor 10 is able to measure a distance to the measured target in a y-axis direction in a line shape in the x-axis direction. The line sensor 10 emits a laser beam, and receives laser light reflected on the measured target. With this, a surface shape (boundary) of an object (measured target) placed on a coordinate plane facing the line sensor 10 is detected. In the line sensor 10, the center axis 11 of the laser beam is to be the y-axis, and the axis which passes the origin O determined in advance and which is orthogonal to the y-axis is to be the x-axis. The line sensor 10 outputs coordinate values (x, y) in the direction along the x-axis and the y-axis. For example, the line sensor 10 obtains n combinations of $(x_i, y_i)$ (i=1 to n) with the number of measured points as n. Actually, the line sensor 10 outputs the limited measured data within a measured range 12.

In FIG. 1, the center axis 11 of the laser beam emitted from the line sensor 10 and the measured range 12 measured by the line sensor 10 are shown with a long and short dash line, but these are virtual and an object does not exist as the center axis 11 and the measured range 12.

Figure 2:
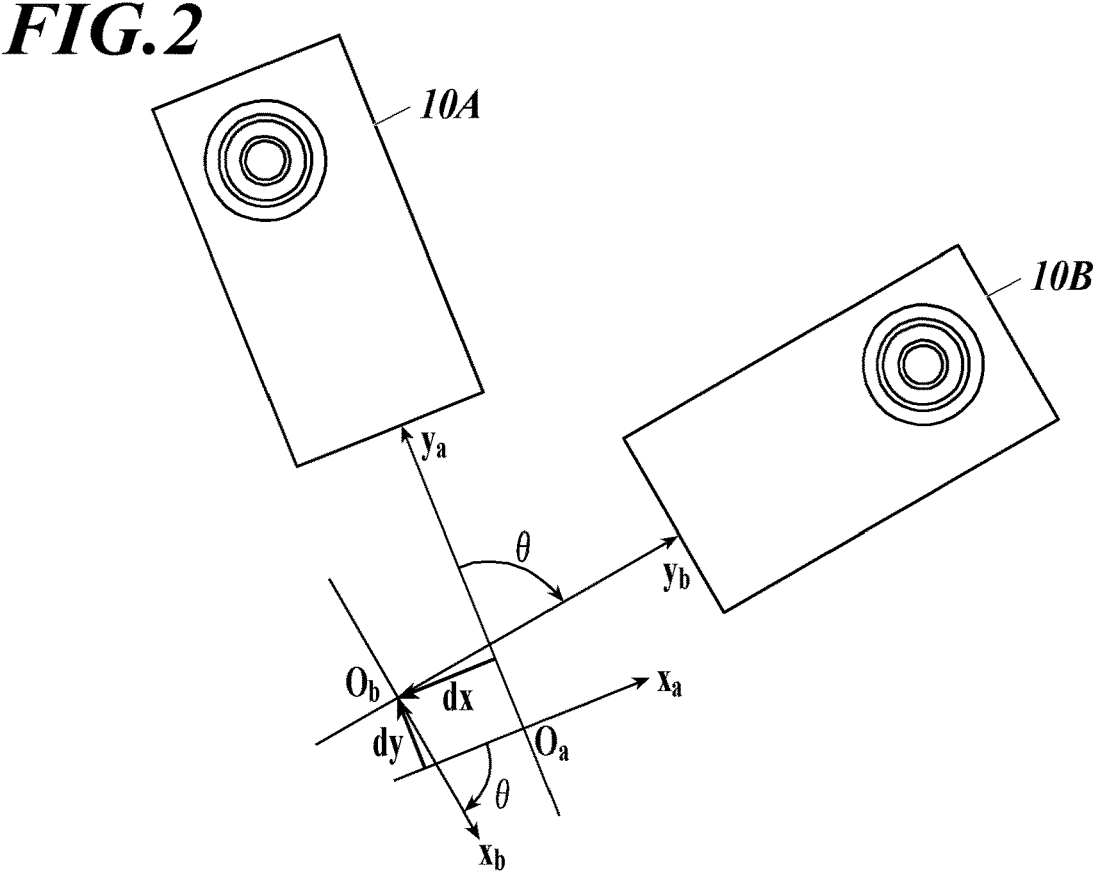
FIG. 2 is a diagram which describes an arrangement of a first line sensor and a second line sensor.

Two line sensors 10 are prepared, and in order to discriminate the two line sensors 10, the line sensors 10 are referred as a first line sensor 10A and a second line sensor 10B. As shown in FIG. 2, the first line sensor 10A and the second line sensor 10B are arranged so that a first coordinate plane measured by the first line sensor 10A and a second coordinate plane measured by the second line sensor 10B are the same or parallel.

The measured data obtained by the line sensors 10A, 10B are shown with coordinate values (x, y) in directions along the x-axes and the y-axes with relation to the line sensors 10A and 10B with the origins of the line sensors 10A, 10B as the reference. In FIG. 2, the origin, x-axis, and y-axis for the first line sensor 10A are shown as $O_a$, $x_a$-axis, and $y_a$-axis, and the origin, x-axis, and y-axis for the second line sensor 10B are shown as $O_b$, $x_b$-axis, and $y_b$-axis.

The angle of the same coordinate axes (x-axes, y-axes) between the first line sensor 10A and the second line sensor 10B is shown as θ. Specifically, the angle of the $x_b$-axis of the second line sensor 10B with reference to the $x_a$-axis of the first line sensor 10A (angle of the $y_b$-axis of the second line sensor 10B with reference to the $y_a$-axis of the first line sensor 10A) is to be θ. Here, θ is shown with the counter clockwise direction being positive. This similarly applies below when the angle is shown.

The relative position of the origin $O_b$ of the second line sensor 10B in the coordinate system of the first line sensor 10A (viewed from the coordinate system of the first line sensor 10A) is to be (dx, dy).

The relation of the positions between the first line sensor 10A and the second line sensor 10B (angle, relative position) is obtained, the measured data measured by one line sensor can be converted to the coordination system of the other line sensor, and the data can be handled on the same coordinate system.

[Summary of Stereo Calibration]

Next, the summary of stereo calibration of the first line sensor 10A and the second line sensor 10B is described. The stereo calibration is calibration of the relation of the positions of the measured data output by the two line sensors.

Figure 3:
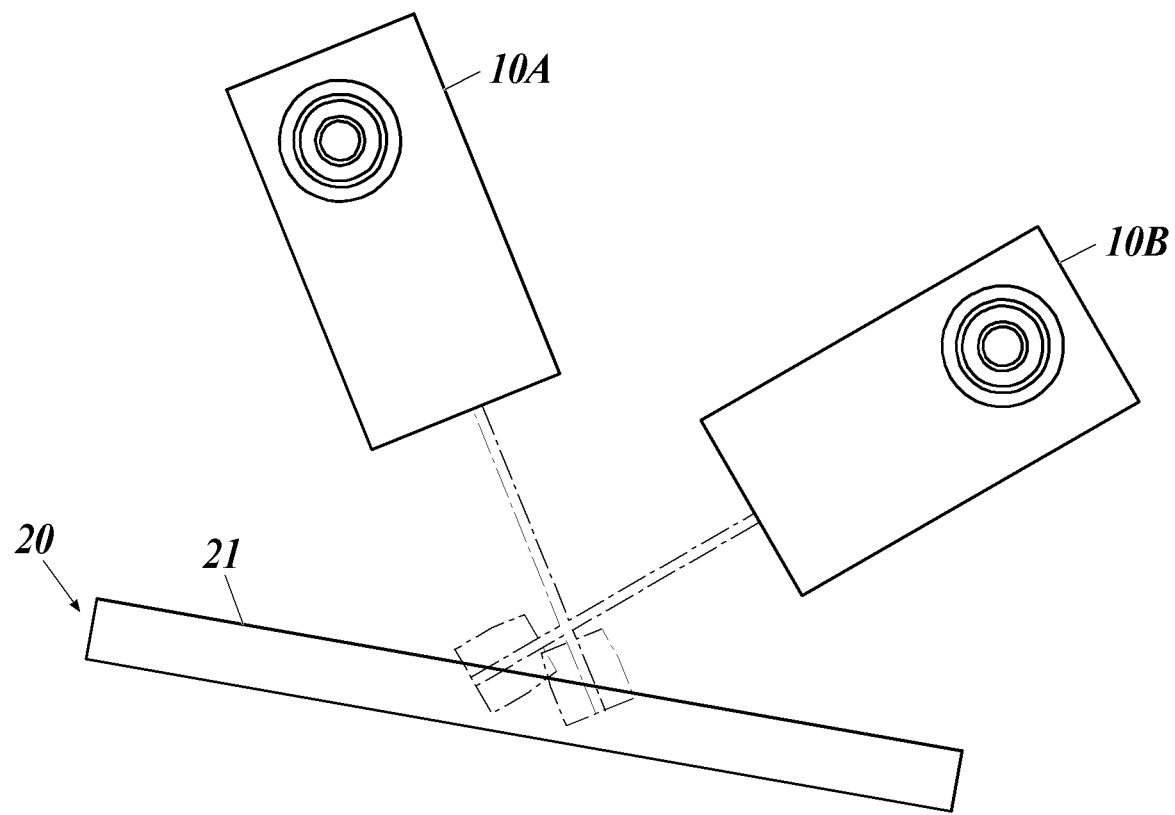
FIG. 3 is a diagram showing a relation of the positions of a reference plane plate with relation to the first line sensor and the second line sensor.

As shown in FIG. 3, the first line sensor 10A and the second line sensor 10B measure a plane surface 21 of a reference plane plate 20. The reference plane plate 20 is positioned so that the plane surface 21 is orthogonal to the first coordinate plane measured by the first line sensor 10A and the second coordinate plane measured by the second line sensor 10B.

Figure 4:
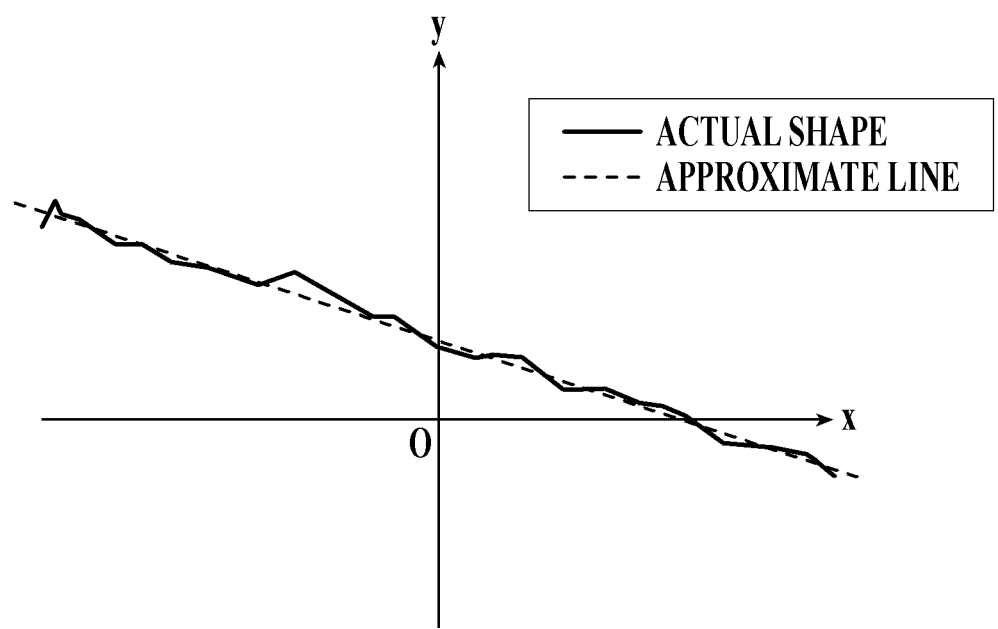
FIG. 4 is a diagram showing measured data (actual shape) and an approximate line obtained by the line sensor.

The measured data (x, y) obtained by measuring the plane surface 21 of the reference plane plate 20 with the first line sensor 10A and the second line sensor 10B is actually uneven data as shown in FIG. 4. By using a least squares method on the data, the approximate line corresponding to the plane surface 21 of the reference plane plate 20 can be obtained.

Figure 5A:
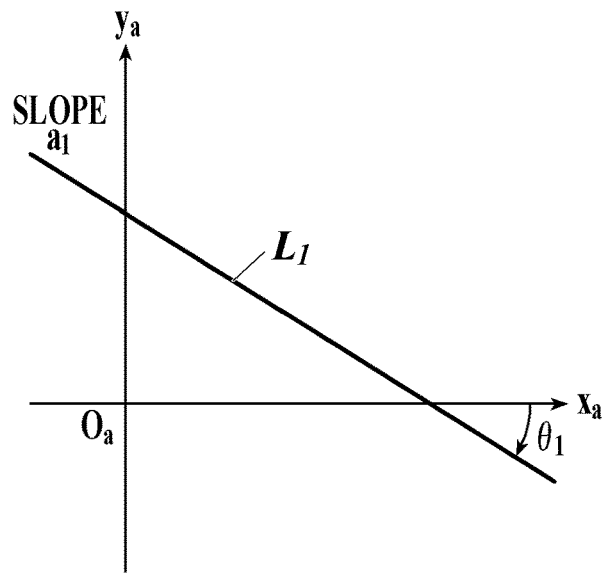
FIG. 5A is a diagram showing an approximate line obtained from measured data of the reference plane plate obtained by the first line sensor.

FIG. 5A shows an approximate line $L_1$ obtained from measured data $(x_{ai}, y_{ai})$ (i=1 to n) of the plane surface 21 of the reference plane plate 20 obtained by the first line sensor 10A. The slope of the approximate line $L_1$ is to be $a_1$, the angle between the $x_a$-axis and the approximate line $L_1$ is to be $\theta_1$ (angle to the approximate line $L_1$ when the plus direction of the $x_a$-axis is the reference), and $\theta_1$ can be obtained by the following equation (1).

Equation (1)

$$\theta_1 = \tan^{-1} a_1 \qquad (1)$$

Figure 5B:
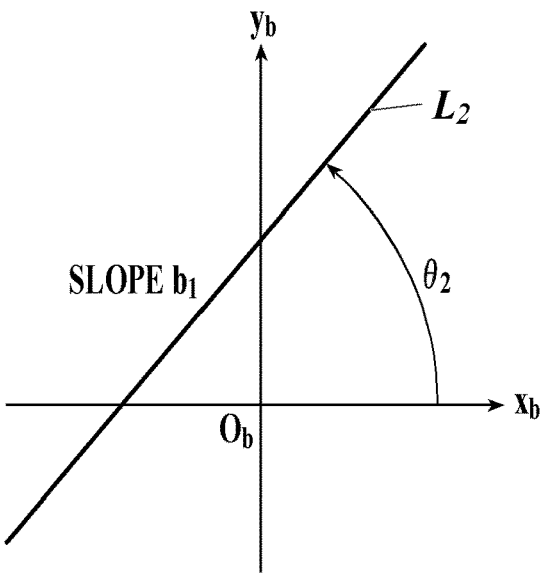
FIG. 5B is a diagram showing an approximate line obtained from measured data of the reference plane plate obtained by the second line sensor.

FIG. 5B shows an approximate line $L_2$ obtained from measured data $(x_{bi}, y_{bi})$ (i=1 to n) of the plane surface 21 of the reference plane plate 20 obtained by the second line sensor 10B. The slope of the approximate line $L_2$ is to be $b_1$, the angle between the $x_b$-axis and the approximate line $L_2$ is to be $\theta_2$ (angle to the approximate line $L_2$ when the plus direction of the $x_b$-axis is the reference), and $\theta_2$ can be obtained by the following equation (2).

Equation (2)

$$\theta_2 = \tan^{-1} b_1 \qquad (2)$$

Figure 6:
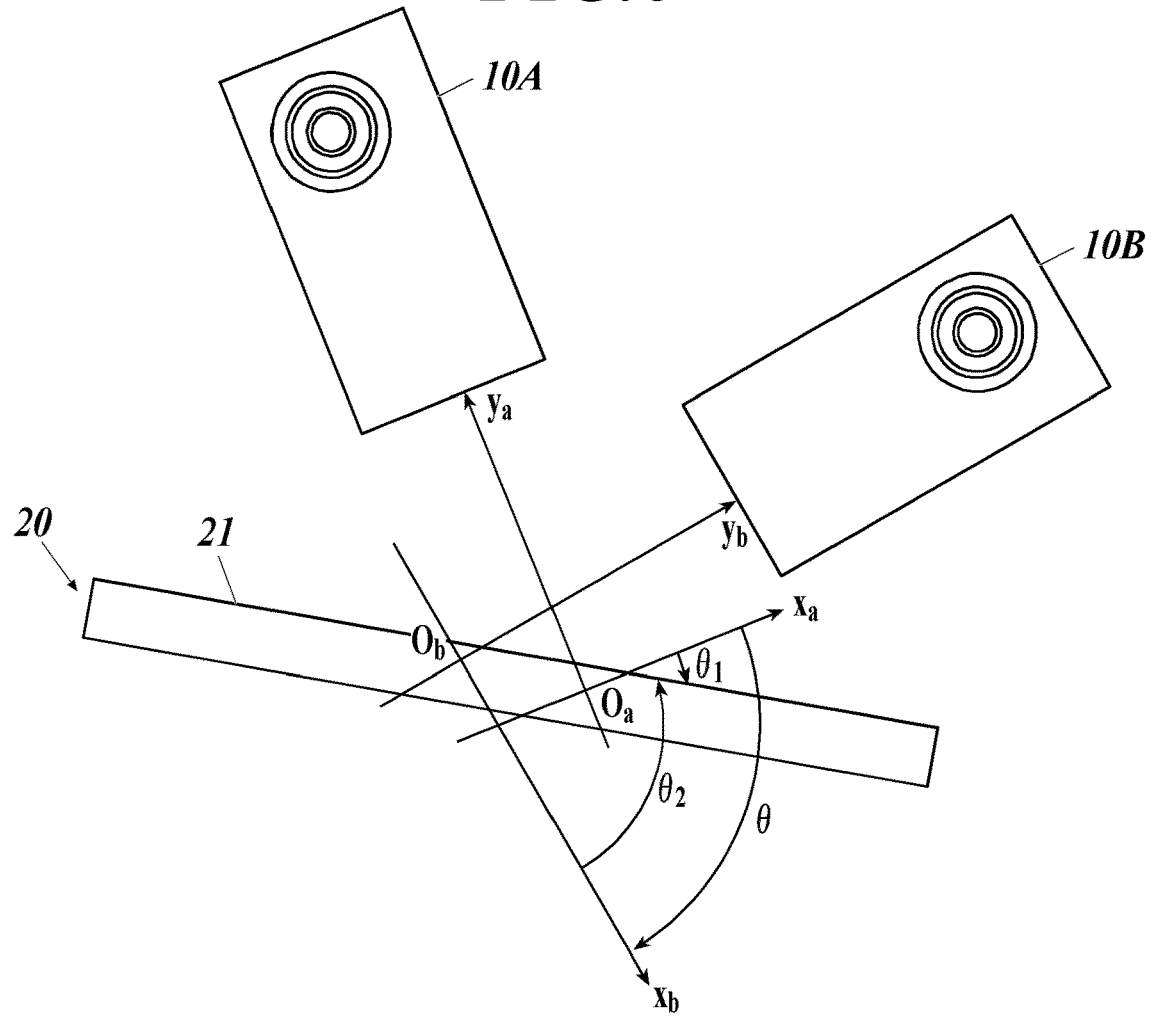
FIG. 6 is a diagram which describes how to obtain an angle between the same coordinate axes with the first line sensor and the second line sensor.

As shown in FIG. 6, the angle of the $x_b$-axis of the second line sensor 10B with reference to the $x_a$-axis of the first line sensor 10A is $\theta$. According to equation (3), the angle $\theta$ can be calculated from $\theta_1$ and $\theta_2$.

Equation (3)

$$\theta = \theta_1 - \theta_2 \qquad (3)$$

The angle is positive in the counter-clockwise direction and negative in the clockwise direction. Therefore, in FIG. 6, $\theta_1$ is a negative value, $\theta_2$ is a positive value, and $\theta$ is a negative value.

Next, the measured data obtained by the second line sensor 10B (shape of the reference plane plate 20) is converted to the coordinate system in which coordinate axes the same as the coordinate axes for the first line sensor 10A ($x_a$-axis, $y_a$-axis) are aligned in the same direction.

Figure 7A:
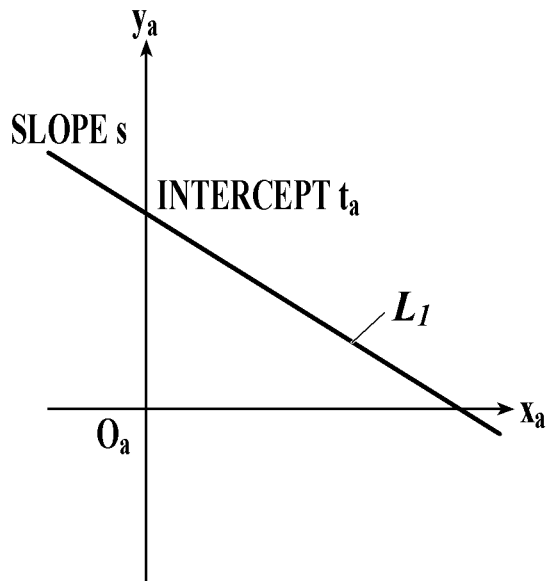
FIG. 7A is a diagram which describes a slope and an intercept of a line corresponding to the measured data of the reference plane plate obtained from the first line sensor.

As shown in FIG. 7A, the slope of the line $L_1$ corresponding to the measured data of the plane surface 21 of the reference plane plate 20 obtained from the first line sensor 10A is to be s ($=a_1$), and the intercept (y intercept) is to be $t_a$.

Figure 7B:
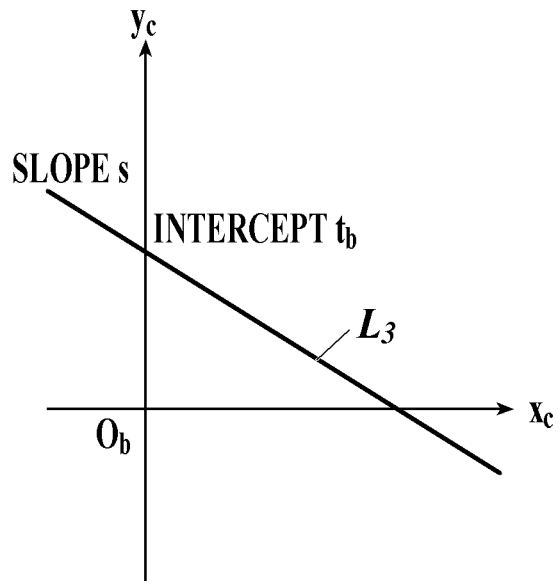
FIG. 7B is a diagram which describes a slope and an intercept of a line as a result of obtaining a line of the measured data of the reference plane plate obtained from the second line sensor rotated in an angle θ with the origin of the second line sensor as the center.

In order to align the direction of the coordinate axes ($x_b$-axis, $y_b$-axis) of the second line sensor 10B with the coordinate axes ($x_a$-axis, $y_a$-axis) of the first line sensor 10A, the coordinate axes for the second line sensor 10B ($x_b$-axis, $y_b$-axis) are to be rotated in an angle ($-\theta$) with the origin $O_b$ of the second line sensor 10B as the center. If the rotated coordinate axes are to be ($x_c$-axis, $y_c$-axis), as shown in FIG. 7B, the line $L_3$ corresponding to the plane surface 21 of the reference plane plate 20 shown with the $x_c$-$y_c$ coordinate system corresponds to the line $L_2$ (see FIG. 5B) corresponding to the measured data of the plane surface 21 of the reference plane plate 20 obtained from the second line sensor 10B rotated the angle $\theta$ around the origin $O_b$ of the second line sensor 10B as the center.

As described above, if the rotation process is performed in the amount of the angle $\theta$ on the measured data obtained by measuring the plane surface 21 of the reference plane plate 20 with the second line sensor 10B, the line $L_3$ is obtained. According to the rotation process, the slope s of the lines $L_1$, $L_3$ corresponding to the measured data obtained by the two line sensors 10A, 10B are aligned. The intercept (y intercept) of the line $L_3$ obtained by performing the rotation process on the measured data measured by the second line sensor 10B is to be $t_b$. By performing the rotation process, the slope s of the lines $L_1$, $L_3$ corresponding to the measured data obtained by the two line sensors 10A, 10B are aligned.

Figure 8:
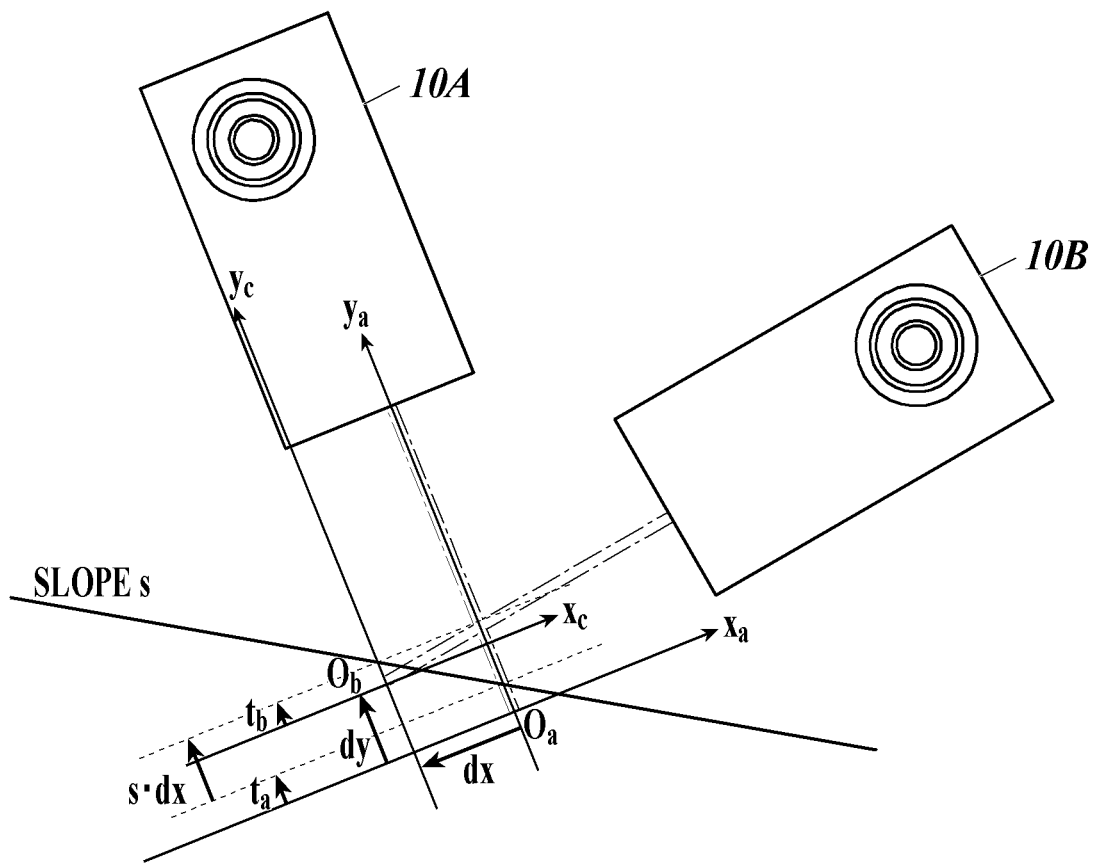
FIG. 8 is a diagram showing a state with the direction of the coordinate axis of the second line sensor aligned with the first line sensor.

The intercept (y intercept) of the line $L_3$ obtained by performing the rotation process on the measured data measured by the second line sensor 10B is to be $t_b$. The relative position of the origin $O_b$ of the second line sensor 10B with respect to the origin $O_a$ of the first line sensor 10A is (dx, dy). Therefore, as shown in FIG. 8, if there is focus on the y-axis direction ($y_a$-axis, $y_c$-axis) among the relation of the positions between the origin $O_a$ of the first line sensor 10A and the origin $O_b$ of the second line sensor 10B, the following relationship equation (4) is achieved.

Equation (4)

$$s' \cdot dx + t_a - t_b = dy \qquad (4)$$

The slope (position) of the reference plane plate 20 with relation to the first line sensor 10A and the second line sensor 10B is changed and the measured data is obtained again by the first line sensor 10A and the second line sensor 10B. With this, the similar process is performed. The change in the slope of the reference plane plate 20 changes the slope of the line corresponding to the measured data of the reference plane plate 20 in the first coordinate plane and the second coordinate plane. The change in the slope of the reference plane plate 20 is performed by rotating the reference plane plate 20 around the axis orthogonal to the first coordinate plane and the second coordinate plane while maintaining the arrangement of the plane surface 21 of the reference plane plate 20 being orthogonal to the first coordinate plane and the second coordinate plane.

Here, the slope of the line $L_1'$ corresponding to the measured data of the plane surface 21 of the reference plane plate 20 obtained from the first line sensor 10A is to be s', the intercept is to be $t_a'$, the slope of the line $L_3'$ which is the line after rotating around the origin $O_b$ in the amount of the angle $\theta$ the line $L_2'$ corresponding to the measured data of the plane surface 21 of the reference plane plate 20 obtained from the second line sensor 10B is to be s', and the intercept is to be $t_b'$. With this, similar to the above, the relation equation (5) can be obtained.

Equation (5)

$$s' \cdot dx + t_a' - t_b' = dy \qquad (5)$$

The slope s of the lines $L_1$, $L_3$, the intercept $t_a$ of the line $L_1$, and the intercept $t_b$ of the line $L_3$ obtained from the first measurement and the slope s' of the lines $L_1'$, $L_3'$, the intercept $t_a'$ of the line $L_1'$, and the intercept $t_b'$ of the line $L_3'$ obtained from the second measurement are all known. The relative position (dx, dy) of the Origin $O_b$ of the second line sensor 10B with relation to the origin $O_a$ of the first line sensor 10A is obtained by calculating the equation (4) and the equation (5) as simultaneous equations.

If the reference plane plate 20 is measured as three or more types of slopes (position), the relation shown by the above equation (4) and the equation (5) can be obtained in the number of times the measurements are performed. The relative position (dx, dy) of the origin $O_b$ of the second line sensor 10B with relation to the origin $O_a$ of the first line sensor 10A can be obtained by the least squares method.

As described above, by obtaining the angle θ for the same coordinate axes and the relative position (dx, dy) in the two line sensors 10A and 10B, the measured data of the first line sensor 10A and the second line sensor 10B can be handled on the same coordinate system.

Figure 9:
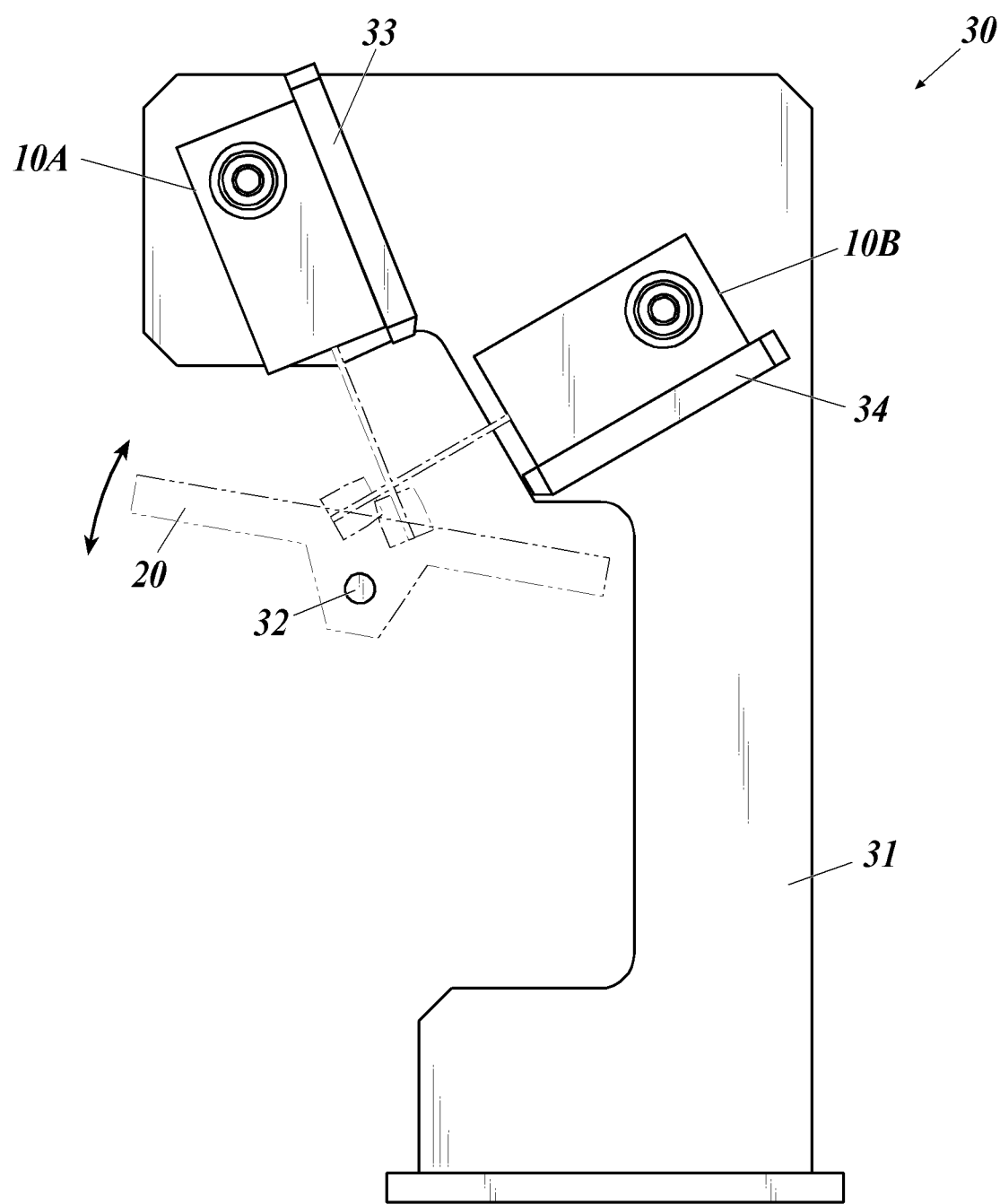
FIG. 9 is a diagram showing a configuration of an assembling jig.

FIG. 9 shows a configuration of an assembling jig 30. The assembling jig 30 is used to measure the distance between the photoconductor and the developing roller and to adjust the position before attaching the photoconductor and the developing roller used in the electrophotography type image forming apparatus to the image forming apparatus main body.

The assembling jig 30 includes a sensor holding plate 31 and a photoconductor holding axis 32.

The sensor holding plate 31 is a plate shaped member parallel to the sheet shown in FIG. 9. The sensor holding plate 31 is provided with attaching plates 33 and 34. The first line sensor 10A and the second line sensor 10B are positioned on the sensor holding plate 31.

When the first line sensor 10A is attached to the sensor holding plate 31, the first line sensor 10A is fixed to the sensor holding plate 31 with the first line sensor 10A butted to the side surface of the attaching plate 34.

When the second line sensor 10B is attached to the sensor holding plate 31, the second line sensor 10B is fixed to the sensor holding plate 31 with the second line sensor 10B butted to the side surface of the attaching plate 34.

With this, a first coordinate plane measured by a first line sensor 10A and a second coordinate plane measured by a second line sensor 10B are to be parallel with the sensor holding plate 31. The first coordinate plane and the second coordinate plane are to be the same or parallel. The first line sensor 10A and the attaching plate 33 as one set and the second line sensor 10B and the attaching plate 34 as another set are attached to the sensor holding plate 31. With this, a beam surface of two line sensors 10A and 10B become parallel, and the measurement accuracy can be enhanced.

The photoconductor holding axis 32 is an axis which is orthogonal to the sensor holding plate 31, the first coordinate plane measured by the first line sensor 10A and the second coordinate plane measured by the second line sensor 10B. When the positions of the photoconductor and the developing roller are adjusted, the photoconductor holding axis 32 is used to hold the photoconductor. When the calibration is performed for the first line sensor 10A and the second line sensor 10B, the photoconductor holding axis 32 is used to hold the reference plane plate 20 instead of the photoconductor.

Figure 10:
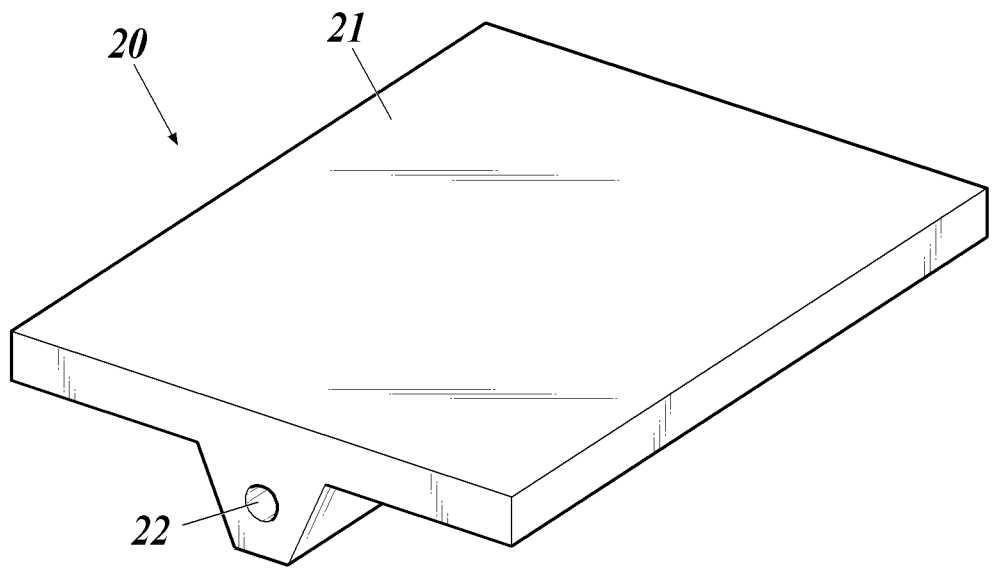
FIG. 10 is a diagram showing an external configuration of a reference plane plate.

FIG. 10 shows an external configuration of the reference plane plate 20. The reference plane plate 20 includes an attaching hole 22 on the side opposite of the plane surface 21. The photoconductor holding axis 32 is inserted through the attaching hole 22. With this, the reference plane plate 20 can be rotated around the photoconductor holding axis 32 in the assembling jig 30.

The reference plane plate 20 includes the attaching hole 22. With this, the slope of the reference plane plate 20 can be easily changed with relation to the first line sensor 10A and the second line sensor 10B fixed to the assembling jig 30. The operation can be easily done when the measured data of the first line sensor 10A and the second line sensor 10B is obtained in two or more positions by rotating the reference plane plate 20.

[Data Processing Apparatus]

Next, a data processing apparatus 40 is described.

Figure 11:
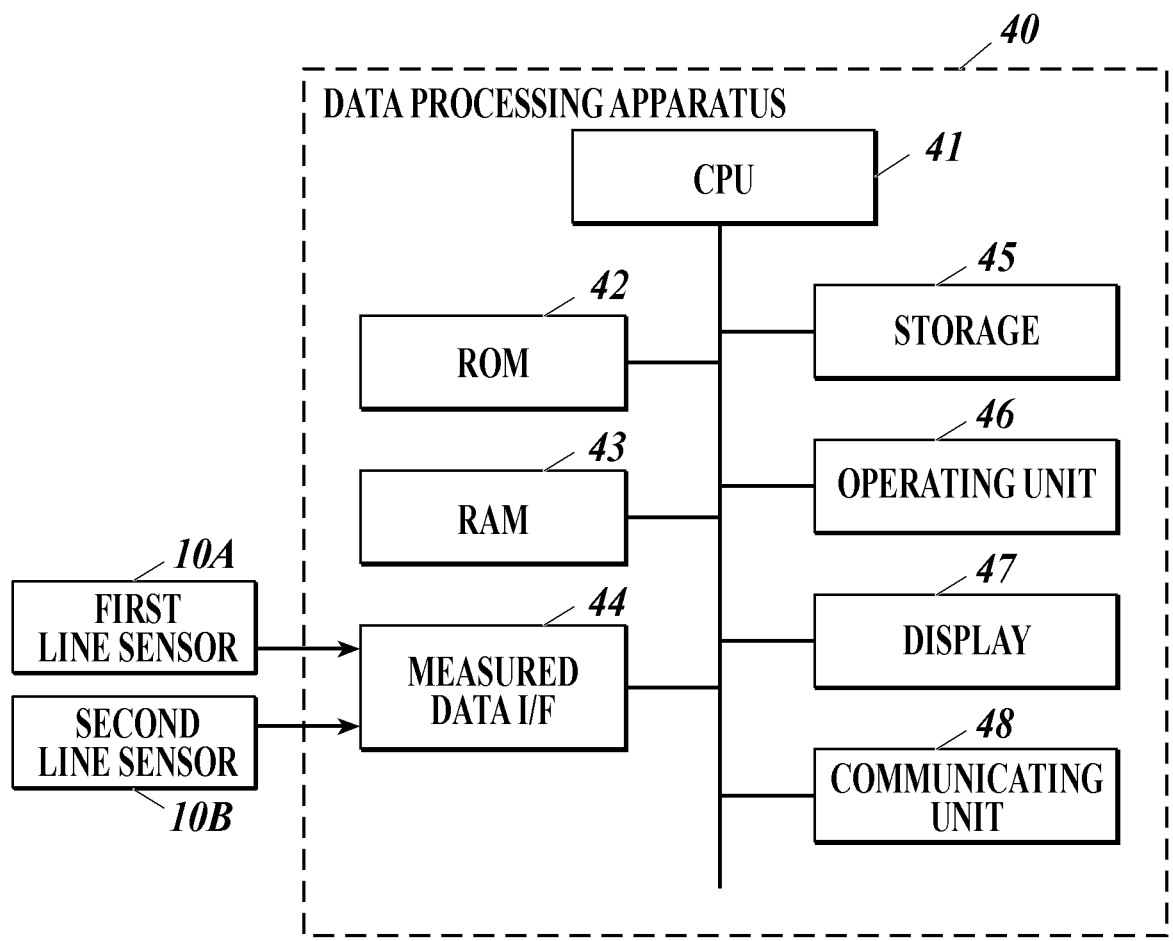
FIG. 11 is a block diagram showing a functional configuration of a data processing apparatus.

FIG. 11 is a block diagram showing a functional configuration of the data processing apparatus 40.

The data processing apparatus 40 includes a CPU (Central Processing Unit) 41 (hardware processor), a ROM (Read Only Memory) 42, a RAM (Random Access Memory) 43, a measured data I/F 44, a storage 45, an operating unit 46, a display 47, and a communicating unit 48.

The CPU 41 centrally controls the processing operation of each unit of the data processing apparatus. Specifically, the CPU 41 reads out various processing programs stored in the ROM 42 and deploys the program in the RAM 43. The CPU 41 performs various processes in coordination with the program.

The ROM 42 stores various processing programs and parameters and files necessary to execute the program.

The RAM 43 forms a work area to temporarily store the various programs read from the ROM 42, input or output data and parameters when various processes are executed under the control of the CPU 41.

The measured data I/F 44 is an interface which performs data communication with the first line sensor 10A and the second line sensor 10B connected through a cable, and the measured data is obtained from the first line sensor 10A and the second line sensor 10B.

The storage 45 includes a HDD or a nonvolatile semiconductor memory, and various types of data are stored.

The operating unit 46 includes a keyboard provided with a cursor key, character input keys, and various function keys, and a pointing device such as a mouse. The operation signal input by operating the keys on the keyboard and the mouse is output to the CPU 41. The operating unit 46 may include a touch panel layered on the display 47, and the operation signal in response to the position operated by touch such as the finger of the operator may be output to the CPU 41.

The display 47 includes a monitor such as a LCD (Liquid Crystal Display) and displays various screens according to the instruction of the display signal input from the CPU 41.

The communicating unit 48 includes a network interface, etc. and transmits and receives data between external devices connected through the communication network such as LAN, WAN, or the internet.

The shape of the measured target is measured as measured data on the two dimensional coordinates by the first line sensor 10A and the second line sensor 10B, and the CPU 41 processes the measured data obtained from the first line sensor 10A and the second line sensor 10B.

The first line sensor 10A and the second line sensor 10B measure the reference plane plate 20 positioned so that the surface (plane surface 21) is orthogonal to the first coordinate plane and the second coordinate plane at two or more positions differed by rotating around the axis (photoconductor holding axis 32) orthogonal to the first coordinate plane and the second coordinate plane. The CPU 41 obtains the measured data from the first line sensor 10A and the second line sensor 10B.

Based on the measured data obtained from measuring two or more positions of the reference plane plate 20 with the first line sensor 10A and the second line sensor 10B, the CPU 41 calculates the angle θ between the same coordinate axes in the first coordinate plane and the second coordinate plane, and the relative position (dx, dy) of the origin $O_a$ of the first coordinate plane and the origin $O_b$ of the second coordinate plane.

Specifically, the CPU 41 calculates the angle θ of the same coordinate axes between the first coordinate plane and the second coordinate plane based on the measured data obtained from the first line sensor 10A and the second line sensor 10B for at least one position among the two or more positions of the reference plane plate 20.

For each of the two or more positions of the reference plane plate 20, the CPU 41 obtains the slope and the intercept of the line on the first coordinate plane corresponding to the measured data obtained from the first line sensor 10A, and the slope and the intercept of the line after the line on the second coordinate plane corresponding to the measured data obtained from the second line sensor 10B is rotated in the angle θ around the origin Ob of the second coordinate plane.

The CPU 41 calculates the relative position (dx, dy) of the origin $O_a$ of the first coordinate plane and the origin $O_b$ of the second coordinate plane based on the slope and the intercept of the line on the first coordinate plane and the slope and the intercept for the line after the rotation on the second coordinate plane obtained for each of the two or more positions.

The CPU 41 converts measured data obtained from the second line sensor 10B to the measured data in the same coordinate system as the first line sensor 10A. Specifically, the CPU 41 rotates the measured data obtained from the second line sensor 10B around the origin $O_b$ of the second coordinate plane in the amount of the angle θ and further moves the measured data parallel in the x-axis direction (dx) and the y-axis direction (dy). By creating in advance the conversion equation to perform such conversion, the measured data obtained from the second line sensor 10B can be converted in the measured data in the coordinate system the same as the first line sensor 10A.

The conversion equation to convert the measured data ($x_b$, $y_b$) obtained from the second line sensor 10B to measured data in the coordinate system the same as the first line sensor 10A is shown in the following equations (6) and (7).

Equation (6)

$$x_a = x_b \cdot \cos\theta - y_b \sin\theta + dx \quad (6)$$

Equation (7)

$$y_a = x_b \cdot \sin\theta + y_b \cdot \cos\theta + dy \quad (7)$$

Next, the operation of the data processing apparatus 40 is described.

Figure 12:
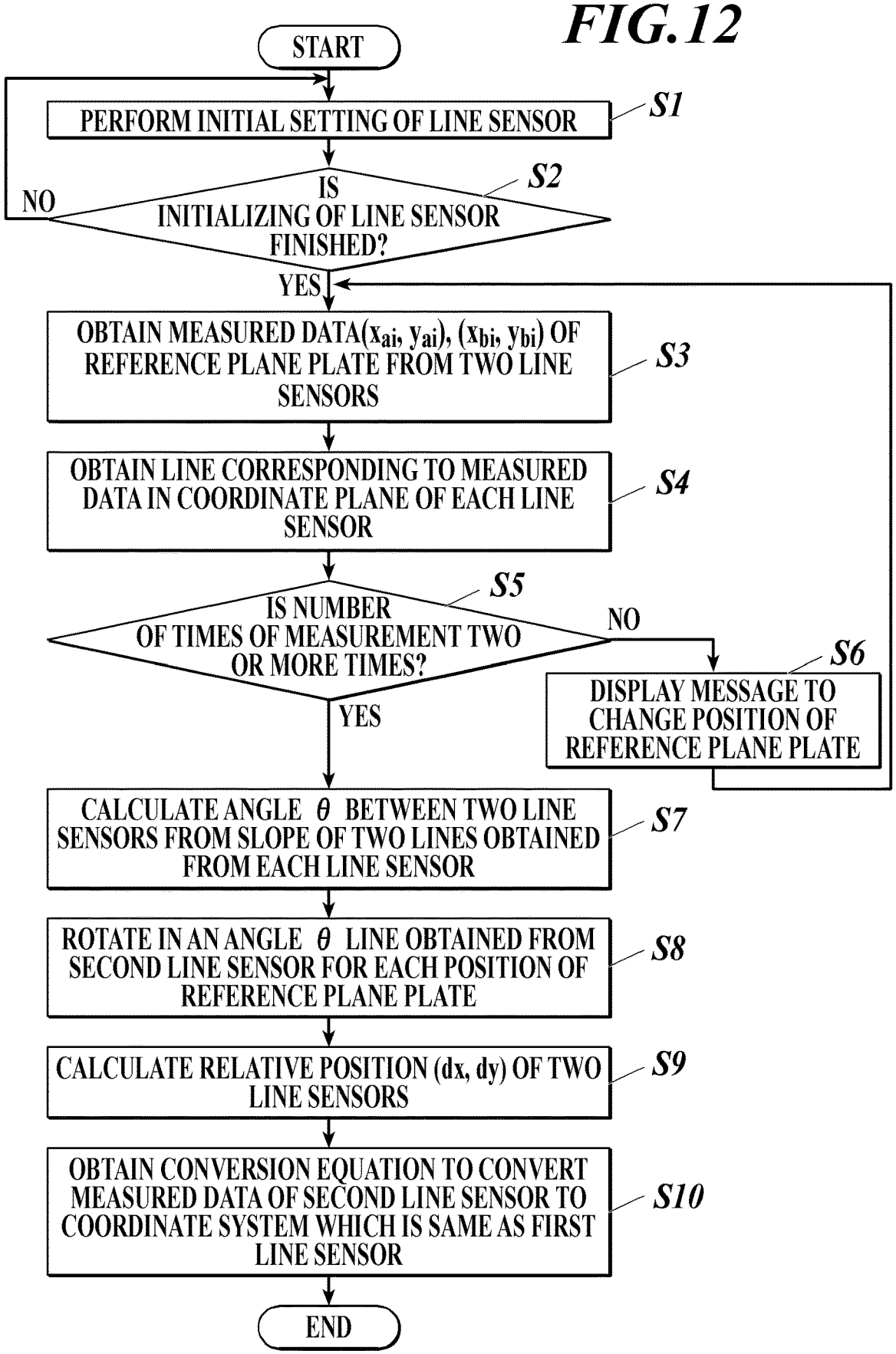
FIG. 12 is a flowchart showing a calibration process performed by the data processing apparatus.

FIG. 12 is a flowchart showing the calibration process performed by the data processing apparatus 40. This process is a process performed with the reference plane plate 20 attached to the assembling jig 30. Such process is realized by a software process performed by the CPU 41 in coordination with a program stored in the ROM 42.

The CPU 41 performs the initial setting on the first line sensor 10A and the second line sensor 10B (step S1).

Next, the CPU 41 determines whether the initializing of the first line sensor 10A and the second line sensor 10B is finished (step S2). If the initializing of the first line sensor 10A or the second line sensor 10B is not finished (step S2; NO), the process returns to step S1 and the initial setting continues.

In step S2, if the initializing of the first line sensor 10A and the second line sensor 10B is finished (step S2; YES), the CPU 41 obtains the measured data ($x_{ai}$, $y_{ai}$) of the plane surface 21 of the reference surface plate 20 from the first line sensor 10A through the measured data I/F 44, and obtains the measured data ($x_{bi}$, $y_{bi}$) of the plane surface 21 of the reference plane plate 20 from the second line sensor 10B (step S3).

Next, the CPU 41 obtains the line corresponding to the measured data ($x_{ai}$, $y_{ai}$) in the first coordinate plane of the first line sensor 10A and obtains the line corresponding to the measured data ($x_{bi}$, $y_{bi}$) in the second coordinate plane of the second line sensor 10B (step S4).

Next, the CPU 41 determines whether the number of times that the reference plane plate 20 is measured by the first line sensor 10A and the second line sensor 10B is two or more times (step S5).

If the number of times that the reference plane plate 20 is measured is less than two times (step S5; NO), the CPU 41 displays on the display 47 a message to change the position of the reference plane plate 20 (step S6). The user rotates the reference plane plate 20 around the photoconductor holding axis 32 and changes the position of the reference plane plate 20. Then, the process returns to step S3, and the process is repeated.

In step S5, if the number of times that the reference plane plate 20 is measured is two or more times (step S5; YES), the CPU 41 calculates the angle θ between the two line sensors 10A and 10B from the slope of the two lines obtained from the first line sensor 10A and the second line sensor 10B in either position (first measurement or second measurement) of the reference plane plate 20 (step S7). Specifically, according to the above equations (1) to (3), the CPU 41 calculates the angle θ of the $x_b$-axis of the second line sensor 10B with reference to the $x_a$-axis of the first line sensor 10A (angle of $y_b$-axis of the second line sensor 10B with reference to the $y_a$-axis of the first line sensor 10A).

Next, the CPU 41 rotates the line on the second coordinate plane corresponding to the measured data of the second line sensor 10B for each position of the reference plane plate 20 in the amount of the angle θ around the origin $O_b$ (step S8). That is, the CPU 41 rotates the line corresponding to the measured data of the second line sensor 10B to match the slope of the line corresponding to the measured data of the first line sensor 10A.

Next, for each position of the reference plane plate 20, the CPU 41 calculates the relative position (dx, dy) of the origin $O_a$ of the first coordinate plane and the origin $O_b$ of the second coordinate plane based on the slope and the intercept of the line on the first coordinate plane corresponding to the measured data of the first line sensor 10A and the slope and the intercept of the line after rotating the line on the second coordinate plane corresponding to the measured data of the second line sensor 10B (step S9). Specifically, the CPU 41 obtains the relative position (dx, dy) of the origin $O_b$ of the second line sensor 10B with relation to the origin $O_a$ of the first line sensor 10A using the equations (4) and (5) as simultaneous equations.

Next, the CPU 41 obtains the conversion equation to convert the measured data obtained from the second line sensor 10B to the measured data in the coordinate system the same as the first line sensor 10A (step S10). Specifically, similar to the above equations (6) and (7), the CPU 41 obtains the conversion equation based on the angle θ of the same coordinate axes between the first coordinate plane and the second coordinate plane and the relative position (dx, dy) of the origin $O_a$ of the first coordinate plane and the origin $O_b$ of the second coordinate plane.

With this, the calibration process ends.

[Adjustment of Positions of Photoconductor and Developing Roller]

Next, the adjustment of the positions of the photoconductor and the developing roller is described.

When the calibration process ends, the user detaches the reference plane plate 20 from the photoconductor holding axis 32 of the assembling jig 30 and attaches the photoconductor to the photoconductor holding axis 32. A developer including the developing roller is attached to the photoconductor on the assembling jig 30.

Figure 13:
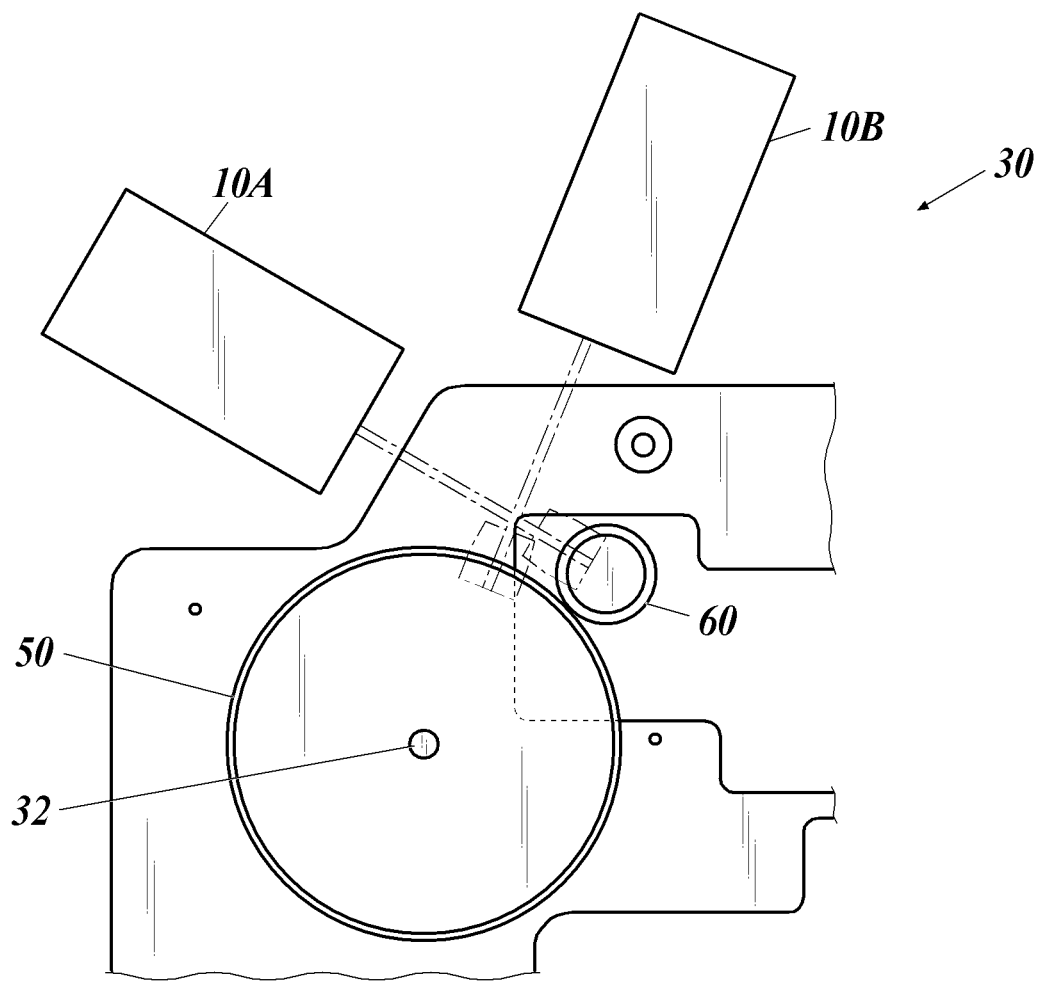
FIG. 13 is a diagram showing a state in which the photoconductor and the developing roller are positioned in the assembling jig.

FIG. 13 shows the photoconductor 50 and the developing roller 60 positioned in the assembling jig 30 in which the first line sensor 10A and the second line sensor 10B are positioned. Here, the first line sensor 10A measures the surface shape of the developing roller 60 and the second line sensor 10B measures the surface shape of the photoconductor 50.

Figure 14:
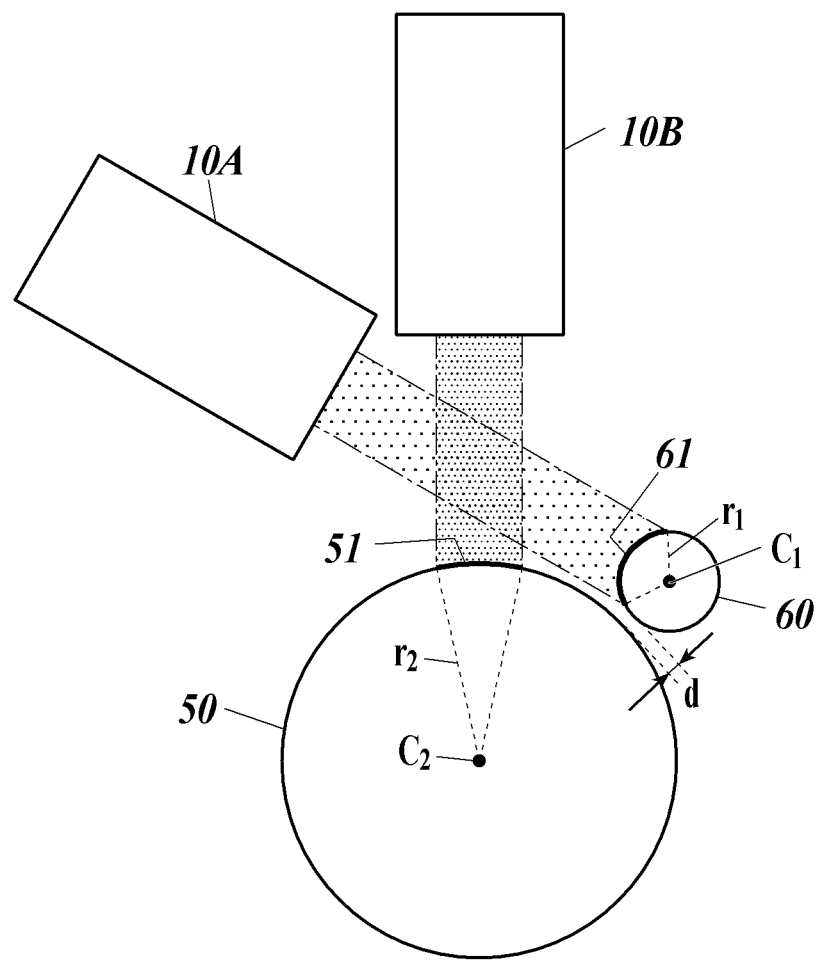
FIG. 14 is a schematic diagram showing a relation of positions of the developing roller measured by the first line sensor and a photoconductor measured by the second line sensor.

As shown in FIG. 14, the first line sensor 10A measures a surface shape 61 of the developing roller 60 and an axis center position $C_1$ and radius $r_1$ of the developing roller 60 is obtained on the first coordinate plane.

The second line sensor 10B measures a surface shape 51 of the developing roller 50 to obtain the measured data. The obtained measured data is converted to the coordinate system of the first line sensor 10A. With this, the surface shape 51 of the photoconductor 50 on the first coordinate plane is obtained, and an axis center position $C_2$ and radius $r_2$ of the photoconductor 50 are obtained on the coordinate system of the first line sensor 10A.

The CPU 41 obtains the distance d of the space between the photoconductor 50 and the developing roller 60 from the axis center position $C_1$ and the radius $r_1$ of the developing roller 60 and the axis center position $C_2$ and the radius $r_2$ of the photoconductor 50 shown on the coordinate system of the first line sensor 10A. Specifically, the radius $r_1$ of the developing roller 60 and the radius $r_2$ of the photoconductor 50 are subtracted from the distance between the axis center position $C_1$ of the developing roller 60 and the axis center position $C_2$ of the photoconductor 50. With this, the distance d of the space between the photoconductor 50 and the developing roller 60 is calculated. As described above, mathematical processes are performed on the measured data obtained from the first line sensor 10A and the second line sensor 10B to measure the distance d between the photoconductor 50 and the developing roller 60.

The CPU 41 displays on the display 47 the distance d of the space between the photoconductor 50 and the developing roller 60.

The user adjusts the positions of the photoconductor 50 and the developing roller 60 while referring to the distance d of the space between the photoconductor 50 and the developing roller 60 displayed on the display 47.

Figure 15A:
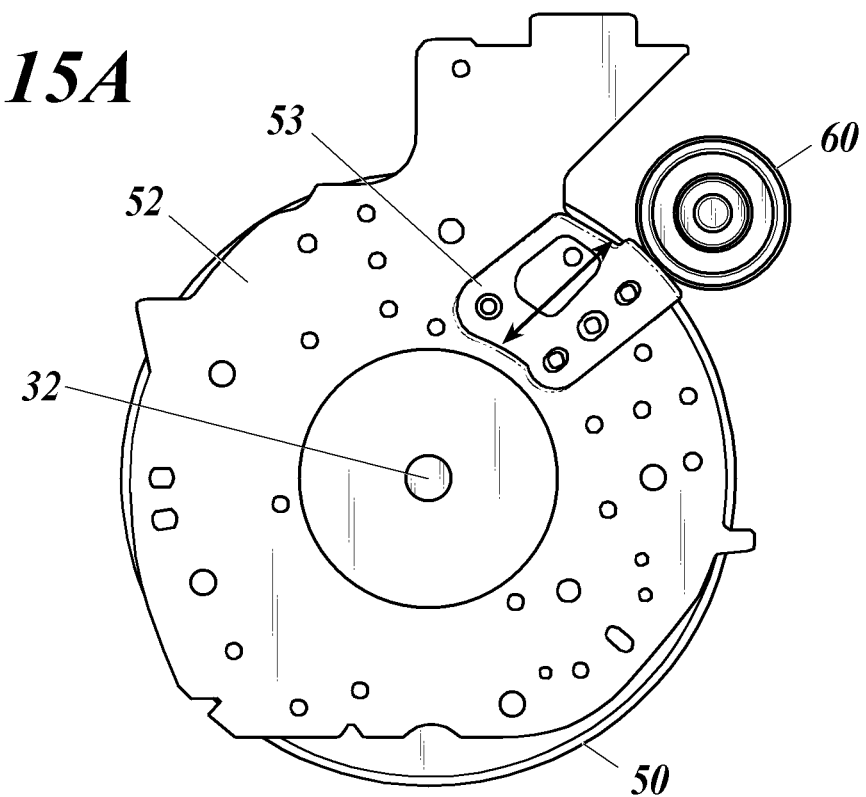
FIG. 15A is a diagram viewing the photoconductor and the developing roller from an axis direction.
Figure 15B:
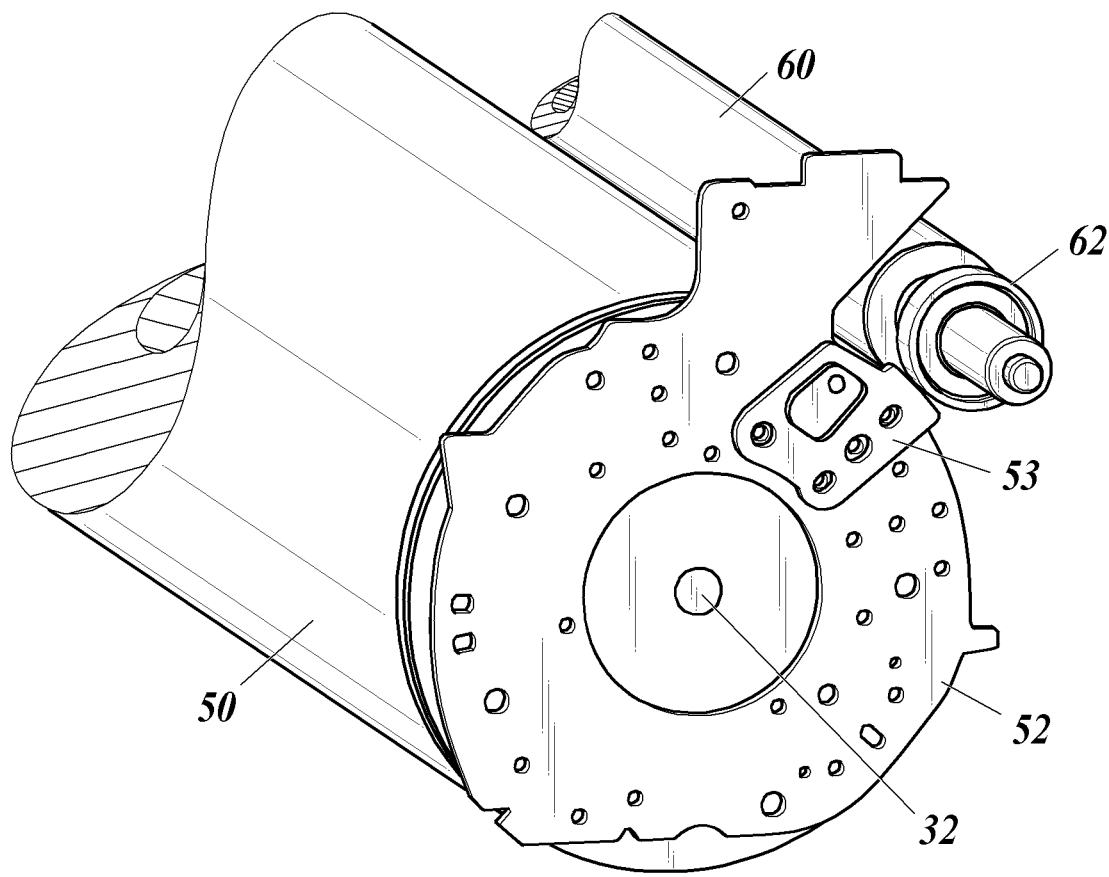
FIG. 15B is a perspective view showing the photoconductor and the developing roller.

FIG. 15A is a diagram showing the photoconductor 50 and the developing roller 60 attached to the assembling jig 30 viewed from the axis direction of the photoconductor 50 and the developing roller 60. FIG. 15B is a perspective diagram showing the photoconductor 50 and the developing roller 60 attached to the assembling jig 30.

The photoconductor 50 is attached to the assembling jig 30 by the photoconductor holding axis 32. A photoconductor holding plate 52 is provided at an end of the photoconductor 50 in the axis direction. A space adjusting plate 53 is provided in the photoconductor holding plate 52, and the position of the space adjusting plate 53 can be changed with relation to the photoconductor holding plate 52 in the radius direction of the photoconductor 50. The mechanism to adjust the position of the space adjusting plate 53 can be any method.

A ring-shaped space adjusting spacer 62 is provided around the axis at an end of the developing roller 60 in the axis direction of the developing roller 60.

The outer side end of the space adjusting plate 53 (outer side end in a radius direction of the photoconductor 50) is in contact with the space adjusting spacer 62 of the developing roller 60. If the space adjusting plate 53 is moved toward the outer side of the photoconductor 50 and the space adjusting spacer 62 is pressed, the distance d of the space between the photoconductor 50 and the developing roller 60 becomes larger. On the other hand, if the space adjusting plate 53 is moved toward the inner side of the photoconductor 50 and the contact on the space adjusting spacer 62 becomes weak, the distance d of the space between the photoconductor 50 and the developing roller 60 becomes smaller. As described above, by moving the space adjusting plate 53, the distance d of the space between the photoconductor 50 and the developing roller 60 can be adjusted.

As described above, according to the present embodiment, the position of the reference plane plate 20 is measured with the two line sensors 10A and 10B, changing the position of the reference plane plate 20. The angle θ between the same coordinate axes on the first coordinate plane and the second coordinate plane and the relative position (dx, dy) between the origin $O_a$ of the first coordinate plane and the origin $O_b$ of the second coordinate plane can be obtained. Therefore, the calibration of the two line sensors 10A and 10B can be performed easily and at a low cost.

Specifically, a mathematical process is performed on the measured data obtained from the line sensors 10A and 10B. With this, the relation of the positions of the line sensors 10A and 10B can be obtained.

The measured data obtained from the second line sensor 10B is converted to the measured data on the same coordinate system as the first line sensor 10A. Therefore, the measured data of the two line sensors 10A and 10B can be handled on the same coordinate system. With this, the relation of the positions of separate objects measured by the line sensors 10A and 10B can be obtained.

For example, the first line sensor 10A and the second line sensor 10B are positioned on the assembling jig 30 used when the photoconductor 50 and the developing roller 60 are attached to assemble the image forming apparatus employing the electrophotography method. With this, the distance d between the photoconductor 50 and the developing roller 60 can be measured accurately.

The photoconductor holding axis 32 provided in the assembling jig 30 is used to hold the reference plane plate 20, and with this, the position of the reference plane plate 20 can be changed easily.

The calibration process is performed when the assembling jig 30 is assembled. With this, the accuracy of measuring the distance d between the photoconductor 50 and the developing roller 60 can be enhanced.

By performing the calibration process on a regular basis, the reliability of the measured values in the assembling jig 30 can be maintained.

The calibration process can be performed if there is a shift in the measured value in the assembling jig 30. For example, by using the assembling jig 30, the space between the photoconductor 50 as the master with relation to the developing roller 60 is measured periodically, and the calibration process is performed when there is a shift in the value. With this, the reliability of the measurement is enhanced.

The description according to the present embodiment is an example of the data processing apparatus according to the present invention, and the present invention is not limited to the above. The detailed configuration and the detailed operation of each unit included in the apparatus can be suitably modified without leaving the scope of the present invention.

For example, the present embodiment describes using two line sensors but four line sensors may be used.

Figure 16:
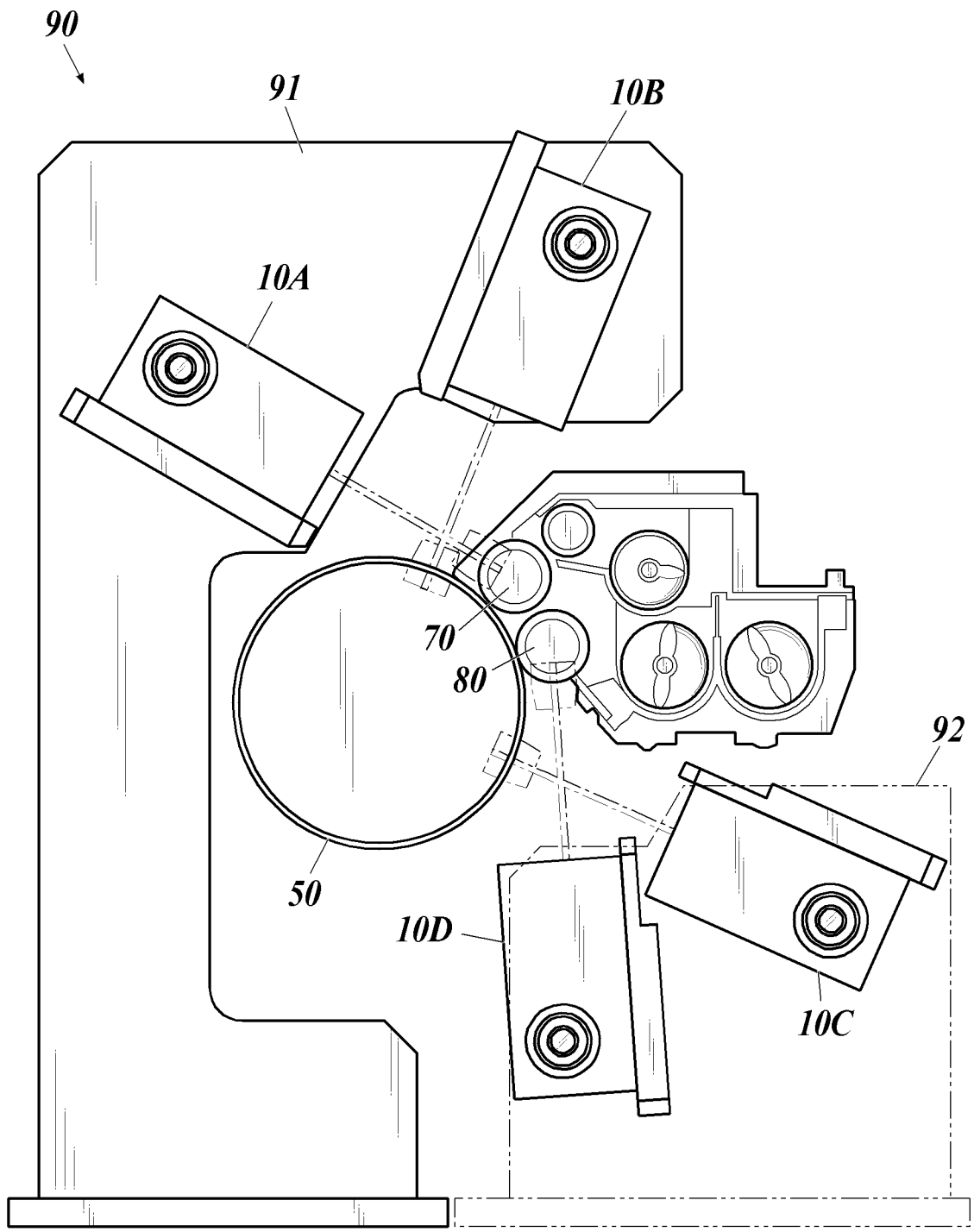
FIG. 16 is a diagram showing a configuration of an assembling jig provided with four line sensors.

FIG. 16 shows a configuration of an assembling jig 90 used to adjust the space when the image forming apparatus is assembled. The image forming apparatus is provided with two developing rollers 70 and 80 with relation to a photoconductor 50.

The assembling jig 90 includes sensor holding plates 91 and 92.

A first line sensor 10A and a second line sensor 10B similar to the above described line sensor 10 are provided on the sensor holding plate 91. A third line sensor 10C and a fourth line sensor 10D similar to the above described line sensor 10 are provided on the sensor holding plate 92. The first line sensor 10A is used to measure a surface shape of the developing roller 70. The second line sensor 10B is used to measure a surface shape of the photoconductor 50. The third line sensor 10C is used to measure the surface shape of the photoconductor 50. The fourth line sensor 10D is used to measure the surface shape of the developing roller 80.

According to the assembling jig 90, the calibration process of the four line sensors 10A to 10D is performed using the reference plane plate 20 (see FIG. 10) before the photoconductor 50 and the developing rollers 70 and 80 are assembled.

Similar to the above described calibration process, the reference plane plate 20 is measured in at least two or more slopes (position) using the three pairs of line sensors 10, specifically, the first line sensor 10A and the second line sensor 10B, the third line sensor 10C and the fourth line sensor 10D, and the second line sensor 10B and the third line sensor 10C. The angle of the same coordinate axes for the two line sensors and the relative position of the origins of the two line sensors are calculated. Further, the measured data obtained from the four line sensors are shown on the same coordinate system based on the relation of the positions of the three line sensors.

After the calibration process finishes, the reference plane plate 20 is detached from the assembling jig 90, and in the assembling jig 90, the positions of the photoconductor 50 and the developing rollers 70 and 80 are adjusted to assemble the apparatus.

The distance of the space between the photoconductor 50 and the developing roller 70 is obtained based on the surface shape of the developing roller 70 measured by the first line sensor 10A and the surface shape of the photoconductor 50 measured by the second line sensor 10B.

The distance of the space between the photoconductor 50 and the developing roller 80 is obtained based on the surface shape of the photoconductor 50 measured by the third line sensor 10C and the surface shape of the developing roller 80 measured by the fourth line sensor 10D.

According to the above description, as the computer readable storage medium including the program to execute the various processes, a ROM is used, but the embodiments are not limited to the above. For example, a portable storage medium such as a CD-ROM, or a nonvolatile memory such as a flash memory can be applied as the computer readable storage medium. A carrier wave may also be applied as the medium to provide data of the program according to the embodiments through the communication lines.

Although embodiments of the present invention have been described and illustrated in detail, the disclosed embodiments are made for purposes of illustration and example only and not limitation. The scope of the present invention should be interpreted by terms of the appended claims.

What is claimed is:

1. A data processing apparatus which processes measured data obtained from a first line sensor and a second line sensor which measure a shape of a measured target as measured data on two-dimensional coordinates, the apparatus comprising:
a hardware processor,
wherein the hardware processor is configured to,
obtain measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and
calculate an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

2. The data processing apparatus according to claim 1, wherein the hardware processor is configured to,
calculate an angle between the same coordinate axes in the first coordinate plane and the second coordinate plane based on the measured data obtained from the first line sensor and the second line sensor in at least one position among the two or more positions in the reference plane plate,
for each of the two or more positions of the reference plane plate, obtain a slope and an intercept of a line on the first coordinate plane corresponding to the measured data obtained from the first line sensor, and obtain a slope and an intercept of a line on the second coordinate plane corresponding to the measured data obtained from the second line sensor rotated in an amount of the angle around the origin of the second coordinate plane, and
calculate the relative position of the origin of the first coordinate plane and the origin of the second coordinate plane based on the slope and the intercept of the line on the first coordinate plane and the slope and the intercept of the line after rotating on the second coordinate plane obtained for each of the two or more positions.

3. The data processing apparatus according to claim 1, wherein the hardware processor is configured to convert the measured data obtained from the second line sensor to the measured data on a coordinate system the same as the first line sensor.

4. The data processing apparatus according to claim 1, wherein the first line sensor and the second line sensor are positioned on a jig to measure a distance between a photoconductor and a developing roller used in an image forming apparatus employing an electrophotography method.

5. The data processing apparatus according to claim 4, wherein,
- a holding axis which holds the photoconductor is provided in the jig,
- the holding axis is used to hold the reference plane plate instead of the photoconductor, and
- the reference plane plate is rotated around the holding axis to measure the reference plane plate in the two or more positions.

6. A data processing method which processes measured data obtained from a first line sensor and a second line sensor which measure a shape of a measured target as measured data on two-dimensional coordinates, the method comprising:
- obtaining measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and
- calculating an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

7. A non-transitory computer-readable storage medium storing a program causing a computer which processes measured data obtained from a first line sensor and a second line sensor which measure a shape of a measured target as measured data on two-dimensional coordinates, the program causing a computer to:
- obtain measured data from the first line sensor and the second line sensor, wherein a first coordinate plane measured by the first line sensor and a second coordinate plane measured by the second line sensor are the same or are parallel, and a reference plane plate positioned so that a surface is orthogonal to the first coordinate plane and the second coordinate plane is measured in two or more positions differed by rotation around an axis orthogonal to the first coordinate plane and the second coordinate plane, and
- calculate an angle between the same coordinate axes in the first coordinate plane and the second coordinate plane and a relative position of an origin of the first coordinate plane and an origin of the second coordinate plane based on measured data obtained from the first line sensor and the second line sensor in the two or more positions of the reference plane plate.

* * * * *